(12) United States Patent
Cremiere et al.

(10) Patent No.: US 10,005,542 B2
(45) Date of Patent: Jun. 26, 2018

(54) FLIGHT CONTROL DEVICE FOR AN AIRCRAFT

(71) Applicant: SAFRAN ELECTRONICS & DEFENSE, Boulogne Billancourt (FR)

(72) Inventors: Benoit Cremiere, Boulogne Billancourt (FR); Cedric Bara, Boulogne Billancourt (FR); Daniel Bezanere, Boulogne Billancourt (FR); Manuel Amaral, Boulogne Billancourt (FR); Oleg Gomolko, Boulogne Billancourt (FR); Pascal Coppee, Boulogne Billancourt (FR)

(73) Assignee: Safran Electronics & Defense, Boulogne-Billancourt (FR)

( * ) Notice: Subject to any disclaimer, the term of this patent is extended or adjusted under 35 U.S.C. 154(b) by 0 days. days.

(21) Appl. No.: 15/552,778

(22) PCT Filed: Mar. 3, 2016

(86) PCT No.: PCT/EP2016/054566
§ 371 (c)(1),
(2) Date: Aug. 22, 2017

(87) PCT Pub. No.: WO2016/146398
PCT Pub. Date: Sep. 22, 2016

(65) Prior Publication Data
US 2018/0043993 A1   Feb. 15, 2018

(30) Foreign Application Priority Data
Mar. 16, 2015   (FR) ...................................... 15 52144

(51) Int. Cl.
B64C 13/10   (2006.01)
G05G 5/03   (2008.04)
B64C 27/56   (2006.01)

(52) U.S. Cl.
CPC .............. B64C 13/10 (2013.01); B64C 27/56 (2013.01); G05G 5/03 (2013.01); *G05G 2505/00* (2013.01)

(58) Field of Classification Search
CPC .......... B64C 13/10; B64C 27/56; G05G 5/03; G05G 2505/00
See application file for complete search history.

(56) References Cited

U.S. PATENT DOCUMENTS

2012/0025031 A1* 2/2012 Stachniak ............... B64C 13/12
244/223
2013/0133465 A1* 5/2013 Kreitmair-Steck ...... G05G 1/04
74/504

FOREIGN PATENT DOCUMENTS

EP   2 078 998 A2   7/2009
EP   2 597 034 A1   5/2013
(Continued)

*Primary Examiner* — Brian M O'Hara
*Assistant Examiner* — Keith L Dixon
(74) *Attorney, Agent, or Firm* — Muncy, Geissler, Olds & Lowe, P.C.

(57) ABSTRACT

The invention relates to a flight control device for an aircraft, including a connection lever, mechanical means for limiting an angular stroke of the connection lever, first means for generating force feedback on the connection lever about said pivot axis, second means for generating force feedback on the connection lever, which means are arranged in parallel with the first means, at least one element selected from the second means and the connection lever comprising mechanical means for connecting them together temporarily, which means are arranged to be active when the connection lever is moved beyond a predetermined angular position in the angular range so that the second means are connected to the connection lever.

9 Claims, 3 Drawing Sheets

(56) References Cited

FOREIGN PATENT DOCUMENTS

| | | |
|---|---|---|
| EP | 2 631 170 A1 | 8/2013 |
| FR | 2 766 158 A1 | 1/1999 |
| FR | 2 872 128 A1 | 12/2005 |
| FR | 2 872 306 A1 | 12/2005 |

* cited by examiner

FLIGHT CONTROL DEVICE FOR AN AIRCRAFT

The invention relates to a flight control device for an aircraft. The invention relates more particularly, but not exclusively, to the collective pitch control of a helicopter.

TECHNOLOGICAL BACKGROUND OF THE INVENTION

A helicopter flight control device makes it possible to control movement of the helicopter via movements imposed by the pilot on a control lever. By way of example, the collective pitch of a helicopter makes it possible to change the inclination of the blades in order to cause the helicopter to rise or descend.

However, when the pilot varies the collective pitch, that action modifies the power delivered by the main turbine. Thus, the pilot must continually ensure that the speed limits of the turbine (running too fast or too slow) are not reached when varying the collective pitch even though those limits can themselves change, for example as a function of stages of flight (takeoff, climbing, descending . . . ). That greatly complicates a pilot's workload.

In order to assist the pilot, it is known to warn the pilot by using an audible or visual alarm when the helicopter is approaching or has reached the speed limits of the turbine (running too fast or too slow) while the collective pitch is being varied.

That type of warning may however be bothersome and stressful for the pilot in the long term.

OBJECT OF THE INVENTION

An object of the invention is to provide a flight control device for an aircraft that makes it possible to avoid the above-mentioned drawback, at least in part.

BRIEF DESCRIPTION OF THE INVENTION

With a view to achieving this object, there is provided a flight control device for an aircraft, the device comprising:
- a connection lever that is designed to be secured to a control lever and that is suitable for being pivoted about at least one pivot axis;
- mechanical means for limiting an angular stroke of the connection lever about said pivot axis, the angular stroke thus being defined by a finite angular range;
- first means for generating force feedback on the connection lever about said pivot axis, the first means being connected permanently to the connection lever;
- second means for generating force feedback on the connection lever, which means are arranged in parallel with the first means; at least one element selected from the second means and the connection lever comprising mechanical means for connecting them together temporarily, which means are arranged to be active when the connection lever is moved beyond a predetermined angular position in the angular range; the second means including at least one anchoring point that is suitable for defining said predetermined position and being arranged to enable movement of said anchoring point relative to limiter means for limiting angular stroke in order to act while in use to redefine said predetermined positions.

Thus, by placing the anchoring point in appropriate manner, the resistance imposed on the connection lever is increased when the pilot acting on the control lever moves the connection lever beyond the predetermined position, thereby warning the pilot that the operational limits of members driven by or linked to said flight control device are being approached. The pilot may then move the control lever, and therefore the connection lever, in the other direction in order to sense a reduction in resistance and thus avoid damaging the device and the control members that said device controls or to which it is connected. However, the connection lever is not blocked, so that in the event of an emergency the pilot can nevertheless force the connection lever in order to oppose the resistance imposed on the connection lever so as to continue to move the connection lever beyond the predetermined position.

Thus, the control device makes it possible to assist the pilot effectively, since the pilot can sense in very intuitive manner, by means of force feedback, that operational limits are being approached.

In addition, the operational limits of the various members linked to or driven by the flight control device may change during a flight, e.g. as a function of the stage of flight of the aircraft. In advantageous manner, the device of the invention is arranged to act while in use to redefine the predetermined positions and thus adapt said predetermined position as a function of stages of flight in order to take account of the change in operational limits.

BRIEF DESCRIPTION OF THE DRAWINGS

The invention can be better understood in the light of the following description of non-limiting implementations of the invention.

Reference is made to the accompanying figures, in which.

DETAILED DESCRIPTION OF THE INVENTION

Figure 1:
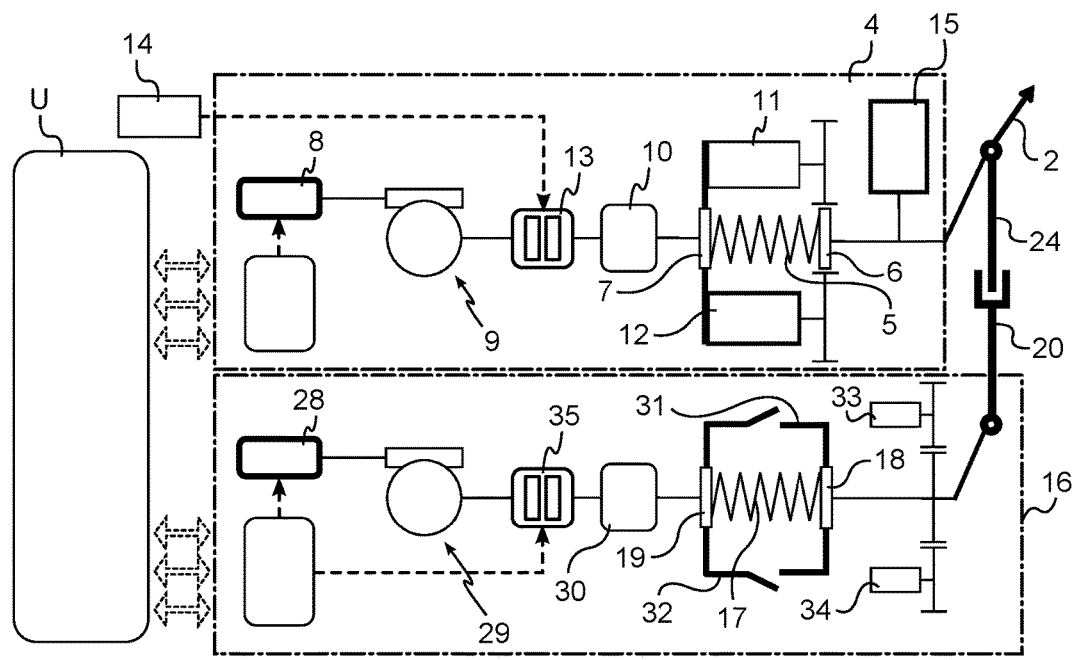
FIG. 1 is a diagram showing a flight control device constituting a first embodiment of the invention.

With reference to FIGS. 1 to 5, the flight control device for an aircraft constituting the first embodiment of the invention is described for controlling the collective pitch of a helicopter.

The device thus comprises a housing 1 and a connection lever 24, which is mounted to pivot relative to the housing 1 about a pivot axis X. In this embodiment, said connection lever 24 is designed to be secured to the collective pitch control lever 2. By way of example, the connection lever 24 comprises a connecting rod.

In known manner, the device comprises mechanical means 3 for limiting angular stroke of the connection lever 24 about said pivot axis X, the angular stroke thus being defined by an angular range 200 of angle α.

The device further comprises first means 4 for generating force feedback on the connection lever 24 about said pivot axis X.

To this end, the first means 4 comprise a first spring 5 including a first plate 6 that is secured to one of the ends of the first spring and that is further connected to pivot with the connection lever 24. The first means 4 are thus connected permanently to the connection lever 24. The first means 4 further comprise a second plate 7 that is secured to the other end of the first spring 5. The first means 4 further comprise a first drive member 8 connected to a movement transmission assembly, which in this embodiment comprises a movement transformation system 9, such as a wormscrew and nut assembly, and a reduction system 10. The wormscrew is connected to rotate with an output shaft of the first drive member 8 and thus forms the inlet element of the transmission assembly. The output shaft of the reduction system 10 is secured to the second plate 7 of the first spring 5 and thus forms the outlet element of the transmission assembly.

Preferably, in this example, the first means 4 include a first angular movement sensor 11 engaging the first spring 5 in order to estimate the relative position between the first end and the second end of the first spring 5. By way of example, the first angular movement sensor 11 is a double rotary variable differential transformer (RVDT). In order to provide redundancy, the first means 4 also include a second angular movement sensor 12, e.g. of the double RVDT type, engaging the first spring 5 in order to estimate the relative position between the first end and the second end of the first spring 5. Furthermore, the first drive member 8 is powered via a control unit U that controls powering of the first drive member 8, and therefore controls the movement of the second end relative to the first end of the first spring 5, in particular using information generated by the first angular movement sensor 11 and by the second angular movement sensor 12.

As a result, when the connection lever 24 is moved by the pilot, by acting on the control lever 2, the first spring 5 is loaded by a movement of its first end relative to its second end, thereby generating force feedback on the connection lever 24.

Furthermore, independently from the movement imposed by the pilot by acting on the control lever 2, it is also possible to modify the relative position of the second end of the first spring 5 relative to the first end of the first spring 5 by moving the second plate 7 by means of the first drive member 8. However, this movement of the second plate 7 is never performed simultaneously with a movement imposed by the pilot on the connection lever 24.

In particular manner, the movement transmission assembly includes temporary coupler means 13 arranged in this embodiment in the movement transmission assembly between the movement transformation system 9 and the reduction system 10. The temporary coupler means 13 may be deactivated directly by the pilot via a control button 14 arranged on the control lever 2 or on a console or instrument panel of the helicopter. When the temporary coupler means 13 are deactivated, the first spring 5 is no longer coupled to the first drive member 8, and in particular to the second plate 7, so there is no longer any force feedback from the first means 4.

The first means 4 further comprise a dry friction element 15 that is arranged so as to be connected permanently to the connection lever 24. Said dry friction element makes it possible to generate purely mechanical resistive torque on the connection lever 24. This enables the first means 4 to always provide force feedback on the connection lever 24 even if the spring breaks, for example.

In the invention, the device comprises second means 16 for generating force feedback on the connection lever 24. The second means 16 are arranged in parallel with the first means 4 in such a manner that the first means and the second means 16 can operate independently of each other as long as they are not touching.

The second means 16 comprise a second spring 17 including a first plate 18 that is secured to one of the ends of the second spring 17 and a second plate 19 that is secured to the other end of the second spring 17. The second means 16 further comprise an operating element 20 that is mounted to pivot relative to the housing 1 so as to pivot about the pivot axis X. In this embodiment, the operating element comprises a first portion 21 fitted with mechanical means for temporary connection to the connection lever 24 and a second portion 22 that is secured to the first portion 21. Furthermore, the second portion 22 is connected to the first plate 18 so that the second portion 22 pivoting about the pivot axis X leads to movement of the first plate 18 relative to the second plate 19 and thus to loading of the second spring 17.

The second means 16 include a second drive member 28 to which a movement transmission assembly is connected, in this embodiment comprising a movement transformation system 29, such as a wormscrew and nut assembly, and a reduction system 30. The wormscrew is connected to rotate with an output shaft of the second drive member 28 and thus forms the inlet element of the transmission assembly. The output shaft of the reduction system 30 is secured to the second plate 19 of the second spring 17 and thus forms the outlet element of the transmission assembly.

The connection lever 24 also includes mechanical means for temporary connection to the operating element 20. To this end, the mechanical means for temporary connection of the connection lever 24 comprise a part 25 that is secured to the connection lever 24 and that is shaped to come into abutment against the first portion 21 of the operating element 20. In particular manner, the part 25 is shaped as an angular sector. In this embodiment, the mechanical means for temporary connection of the operating element 20 comprise a first operating finger 26 that is curved and secured to one of the ends of the first portion 21. The mechanical means for temporary connection of the operating element 20 further comprise a second operating finger 27 that is curved and secured to the other one of the ends of the first portion 21. The operating fingers 26, 27 thus define a circular arc inside which the angular sector 25 can be moved about the pivot axis X without touching the operating fingers 26, 27 and therefore without loading the second spring 17. The first operating finger 26 thus forms a first anchoring point for the angular sector 25, in this embodiment in the form of a first mechanical abutment, and the second operating finger 27 forms a second anchoring point for the angular sector 25, in this embodiment in the form of a second mechanical abutment. In this embodiment, the operating element 20 is shaped in such a manner that the circular arc defined by the two operating fingers 26, 27 presents an angle β greater than the angle α defined by the mechanical means 3 for limiting angular stroke of the connection lever 24 so that the two anchoring points, i.e. in this embodiment the two mechanical abutments, can both be outside the angular range 200.

Thus, when the connection lever 24 is moved by the pilot, by acting on the control lever 2, the first spring 5 is loaded and that gives rise to a first force feedback on the connection lever 24 and therefore on the control lever 2. If the pilot moves the connection lever 24 until the angular sector 25 comes to co-operate with one of the operating fingers 26, 27, then the angular sector 25 drives turning of the operating element 20 which in turn drives movement of the first plate 18 of the second spring 17 relative to the second plate 19 of the second spring 17. The second spring 17 is also loaded and that gives rise to a second force feedback on the connection lever 24, and therefore on the control lever 2, in addition to the first force feedback. The pilot thus senses increased resistance since the control lever 2 is thus associated, via the connection lever 24, with both of the first and second springs 5 and 17.

When the second spring 17 is not loaded, i.e. the connection lever 24 and the operating element 20 are not engaged, the second drive member 28 is arranged to move the second spring 17, via the second plate 19, in order to modify the positions of the two ends of the second spring 17 relative to the mechanical means 3 for limiting angular stroke when the second spring 17 is not loaded.

Since the operating element 20 is connected by its second portion 22 to the first plate 18, movement of the first plate leads to corresponding pivoting of the operating element 20 about the pivot axis X.

Since the operating element 20 is arranged so as to be able to be moved by the second drive member 28 at the same time as the second spring 17, the second drive member 28 enables the operating fingers 26, 27 to be moved together and thus modify the positions of the two mechanical abutments in the angular range 200.

Preferably, the second means 16 include a first load state sensor 31 for sensing the load state of the second spring 17. By way of example, the first sensor 31 comprises a microswitch having an output signal that is equal to 1 if the second spring 17 is not loaded and that is equal to 1 if the second spring 17 is loaded. The second means 16 further include, for questions of redundancy, a second load state sensor 32 for sensing the load state of the second spring 17 that is identical to the first load state sensor 31. In addition, in this embodiment, the second means 16 include a first angular movement sensor 33 engaging the first plate 18 in order to estimate the angular position of the first plate 18 relative to the second plate 19. The sensor 33 thus indicates at all times the position of the operating element 20 that is connected to the first plate 18. By way of example, the first angular movement sensor 33 is an RVDT. For questions of redundancy, the second means 16 also include a second angular movement sensor 34 that is identical to the sensor described above.

Furthermore, the second drive member 28 is powered via the control unit U that already powers the first drive member 8. The control unit U powers the second drive member 28 in particular using information generated by the first angular movement sensor 33, by the second angular movement sensor 34, by the first load state sensor 31 and by the second load state sensor 32.

In particular manner, the movement transmission assembly includes temporary coupler means 35 arranged in this embodiment in the movement transmission assembly between the movement transformation system 29 and the reduction system 30. The temporary coupler means 35 may be deactivated directly by the control unit U.

By means of the control unit U and of the second drive member 28, it is possible to modify jointly the positions of the two ends of the second spring 17 relative to the mechanical means 3 for limiting angular stroke, when the first spring 15 is not loaded and when the second spring 17 is not loaded, and when the positions of the two operating fingers 26, 27 lie in the angular range 200. It is therefore possible to modify the predetermined position(s) of the connection lever 24 at which the connection lever 24 causes the operating element 20 to pivot (via co-operation between the angular sector and the operating finger) and thus drives loading of the second spring 17 in such a manner that the connection lever 24, and therefore the control lever 2, also find themselves connected to the second spring 17. The second means 16 are therefore arranged to enable the mechanical abutments to move relative to the means 3 for limiting angular stroke in order to act while in use to redefine the predetermined positions.

By placing the mechanical abutments in appropriate manner, said abutments define one or more predetermined positions of the control lever 2 (and therefore of the connection lever 24) at which the resistance imposed on the control lever 2 (and therefore on the connection lever 24) is increased when the pilot is approaching operational limits of the turbine.

Since it is known that the operational limits of the turbine can change, in particular as a function of the stage of flight in which the pilot is engaged, the second means 16 are advantageously arranged to redefine the positions of the mechanical abutments while in use, and thus to adapt the predetermined positions, as a function of stages of flight in order to take account of the changes in the operational limits.

Figure 2:
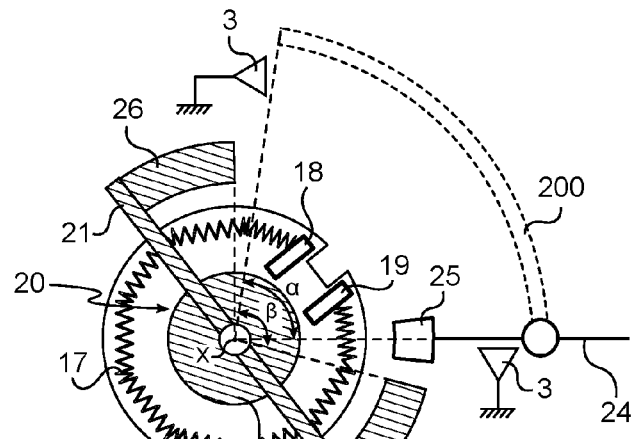
FIG. 2 is a diagrammatic view of a portion of the flight control device shown in FIG. 1 when the predetermined position has a first value.

Typically, as shown in FIG. 2, during a stopped stage, i.e. when the helicopter is on the ground and the turbine is turned off, the second means 16 are arranged in such a manner that the operating element 20 is in a first position referred to as the neutral position. In this position, the two operating fingers 26, 27 are situated outside the angular range 200 in such a manner that the connection lever 24 may be moved over the entire angular range 200 without being connected to the second spring 17.

Figure 3:
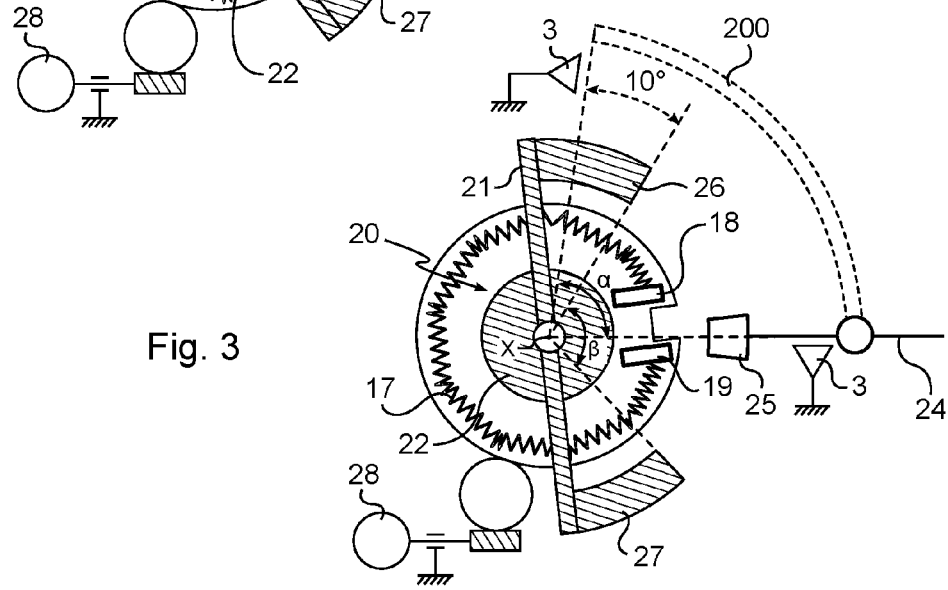
FIG. 3 is a diagrammatic view of a portion of the flight control device shown in FIG. 1 when the predetermined position has a second value.

With reference to FIG. 3, during a takeoff stage, the second drive member 28 is powered so as to rotate simultaneously both plates of the second spring 17 and therefore also the operating element 20. The position of the operating element 20 is thus modified in such a manner that, the first operating finger 26 is now situated in the angular range 200, with the second operating finger 27 still being situated outside the angular range 200. More precisely, in this embodiment, the first operating finger 26 extends so as to form a mechanical abutment ten degrees before the high position of the angular range 200.

As a result, during takeoff, the connection lever 24 may be moved over the entire angular range 200 between the low position of the angular range 200 and the predetermined position defined by the first operating finger 24 by being connected only to the first spring 5. If the connection lever 24 is moved beyond the predetermined position, the connection lever 24 pivots the operating element 20 that will in turn move the first plate 18 of the second spring 17 relative to the second plate 19 in order to load the second spring 17. The connection lever 24, and therefore the control lever 2, is thus connected both to the first spring 5 and also to the second spring 17. Under such circumstances, the pilot senses increased resistance in the control lever 2, indicating that the operational limits of the turbine are being approached, and specifically, in this embodiment, that the turbine is coming close to running too fast. In this event, the pilot lowers the connection lever 24, in order to return it below the predetermined position and avoid damaging the turbine. However, in the event of an emergency, the pilot can nonetheless continue to move the connection lever 24 towards the high position of the angular range 200.

Figure 4:
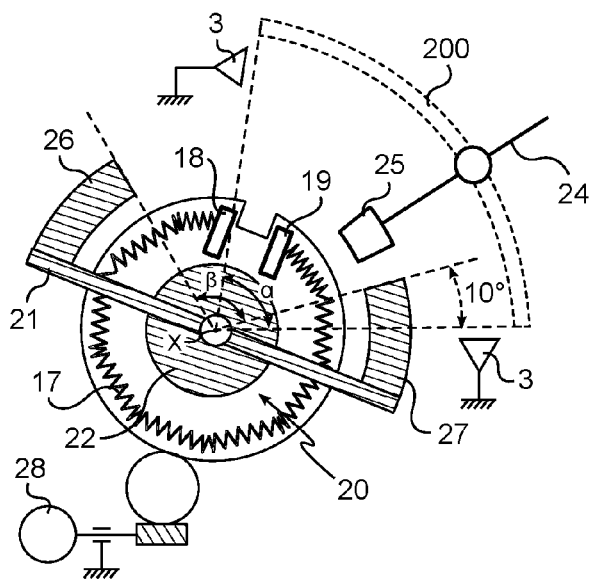
FIG. 4 is a diagrammatic view of a portion of the flight control device shown in FIG. 1 when the predetermined position has a second value.
Figure 5:
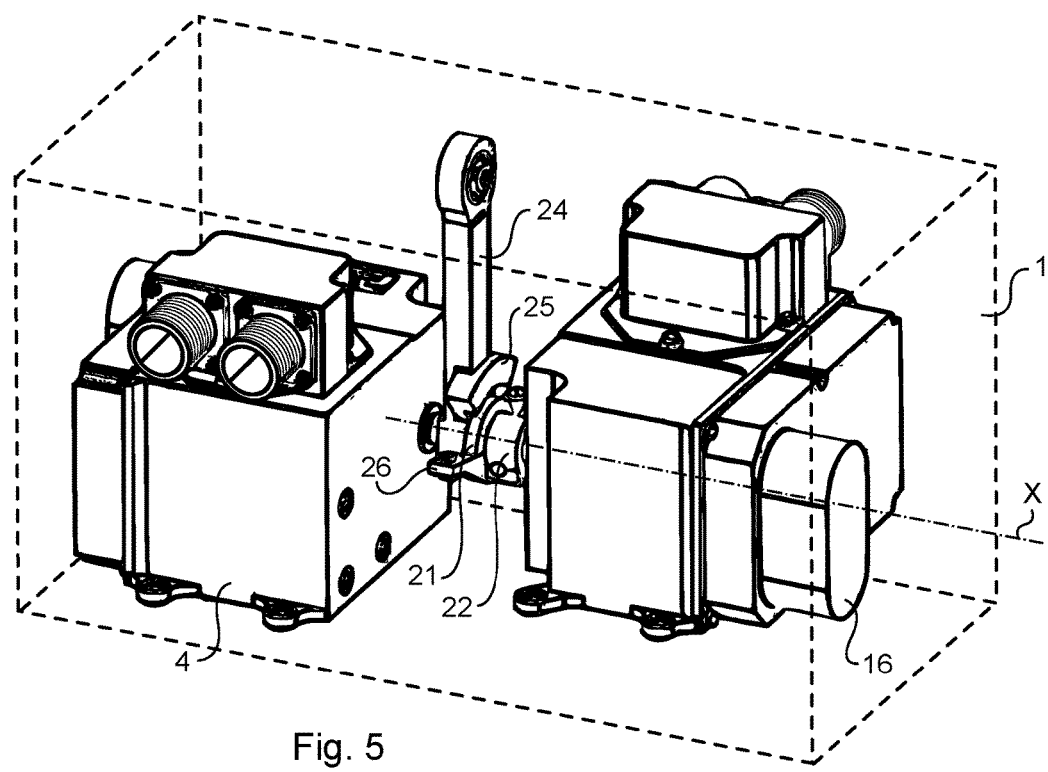
FIG. 5 is a fragmentary perspective view of the flight control device shown in FIG. 1.

With reference to FIG. 4, during another stage of flight, the second drive member 28 is powered so as to pivot simultaneously both plates of the second spring 17 and therefore also the operating element 20. The position of the operating element 20 is thus modified in such a manner that, the first operating finger 26 is now situated in the angular range 200, with the second operating finger 27 being situated in the angular range 200. More precisely, in this embodiment, the second operating finger 27 extends so as to form a mechanical abutment ten degrees before the low position of the angular range 200. In this embodiment, the second operating finger 27 thus defines the predetermined position in which the connection lever 24 becomes connected to the second spring 17.

Thus, by means of the invention, the second means 16 are arranged to act while in use to redefine the positions of the mechanical abutments and therefore to modify the predetermined positions. It is therefore possible to modify continuously the moment at which the pilot senses increased resistance (due to the connection between the second spring 17 and the connection lever 24) indicating that the operational limits of the turbine are coming close.

Figure 6:
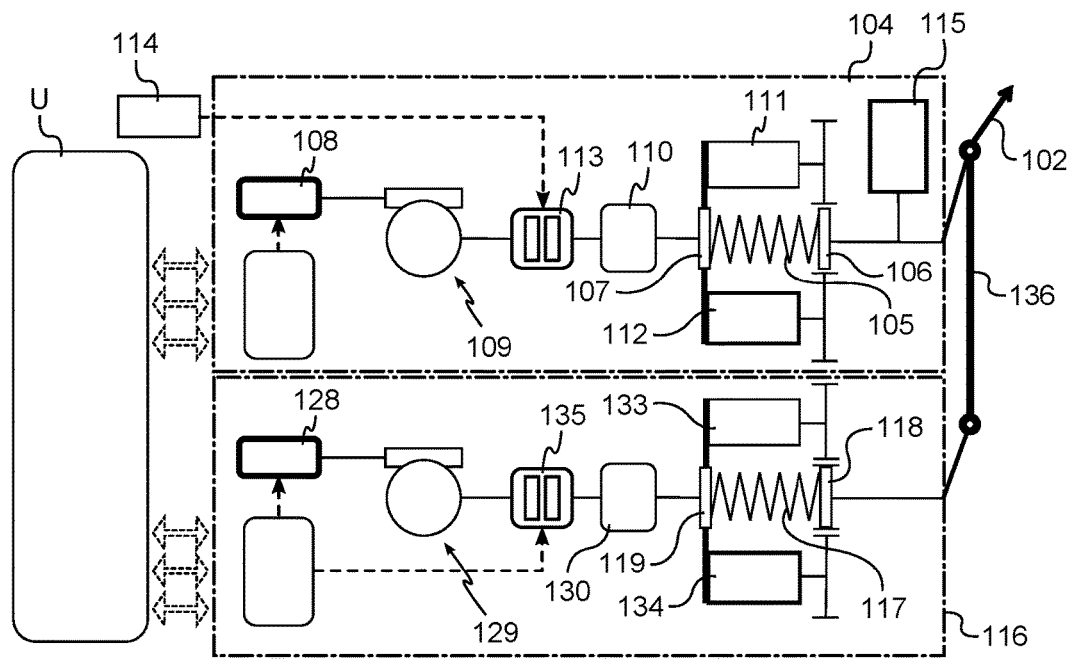
FIG. 6 is a diagram showing a flight control device constituting a second embodiment of the invention.
Figure 7:
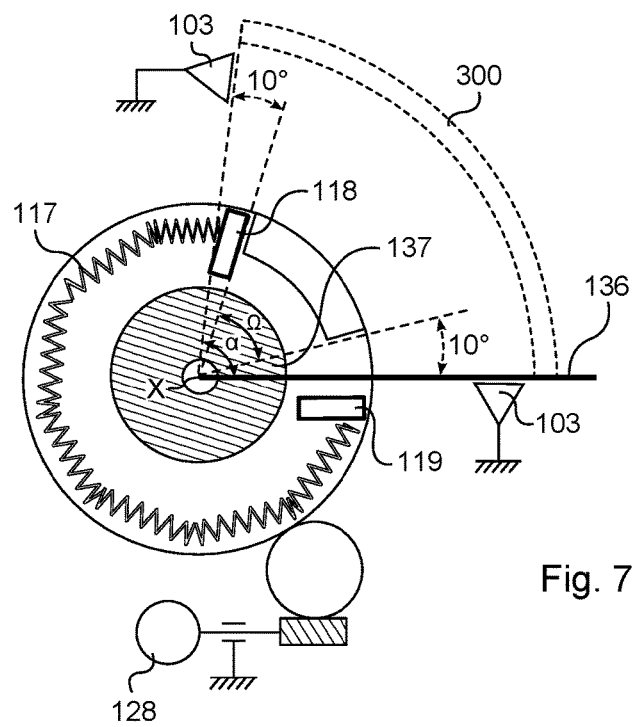
FIG. 7 is a diagrammatic view of a portion of the flight control device shown in FIG. 6 when the predetermined position has a first value.

With reference to FIGS. 6 and 7, a second embodiment of the invention is described below. The elements in common with the first embodiment have the same references plus 100.

The difference with the first embodiment lies in the temporary connection between the second means 116 and the connection lever 136. In the second embodiment, as can be seen in FIG. 7, the second spring 117 with its two plates 118, 119 itself forms the operating element that co-operates with the connection lever 136 in order to be connected temporarily to said connection lever 136. The plates 118, 119 of the spring thus themselves form the mechanical abutments that define the predetermined positions beyond which the connection lever 136 and the second means 116 are connected.

In this embodiment, the second spring 117 is shaped in such a manner that the circular arc Ω defined by the plates of the second spring 117 presents an angle less than the angle α defined by the mechanical means 3 for limiting angular stroke of the connection lever 136 so that the two mechanical abutments can both be in the angular range 300.

By way of example, with reference to FIG. 7, in a particular stage of flight, the second means 116 are arranged in such a manner that the first plate 118 of the second spring 117 is situated in the angular range 300 in order to define a first predetermined position at which the connection lever 136 is connected to the second spring 117. More precisely, in this embodiment the first plate 118 extends at ten degrees before the high position of the angular range 300. The second means 116 are further arranged in such a manner that the second plate 118 of the second spring 117 is situated in the angular range 300 in order to define a second predetermined position at which the connection lever 136 becomes connected to the second spring 117. More precisely, in this embodiment the second plate 119 extends at ten degrees before the low position of the angular range 300.

As a result, the connection lever 136 may be moved over the entire angular range 300 between the first predetermined position and the second predetermined position by being connected only to the first spring 105. If the connection lever 136 is moved beyond the first predetermined position, the connection lever 136 moves the first plate 118 of the second spring 117 relative to the second plate 119 of the second spring 117 in order to load the second spring 117. The connection lever 136 is thus connected to the first spring 105 and to the second spring 117. Under such circumstances, the pilot senses increased resistance in the connection lever 136 indicating that the operational limits of the turbine are being approached, namely that the turbine is coming close to running too fast. In addition, if the connection lever 136 is moved beyond the second predetermined position, the connection lever 136 moves the second plate 119 of the second spring 117 relative to the first plate 118 of the second spring 117 in order to load the second spring 117. The connection lever 136 is thus connected to the first spring 105 and to the second spring 117. Under such circumstances, the pilot senses increased resistance in the connection lever 136 indicating that the operational limits of the turbine are being approached, namely that the turbine is coming close to running too slowly.

Naturally, the invention is not limited to the embodiments described and variants may be applied thereto without going beyond the ambit of the invention, as defined by the claims.

In particular, although in this embodiment the flight control device is described in relation to the collective pitch control of a helicopter, this application is not limiting and the flight control device of the invention could be used for any other application such as for example for managing movement in pitching, in roll, or in yaw of an airplane or of a helicopter.

Although in this embodiment the second means still include two anchoring points that make it possible to define different predetermined positions in the angular range, the device could be arranged to include a single anchoring point that makes it possible to define a single predetermined position. By way of example, for the collective pitch of a helicopter, the second means could include a single anchoring point in order to warn the pilot that the turbine is coming close to running too fast, while the turbine running too slowly is thus authorized.

The operating element could be shaped in such a manner that the circular arc defined by its two anchoring points presents an angle that is less than the angle defined by the mechanical means for limiting angular stroke of the connection lever.

The invention claimed is:

1. A flight control device for an aircraft, the device comprising:
   a connection lever that is designed to be secured to a control lever and that is suitable for being pivoted about at least one pivot axis;
   mechanical means for limiting an angular stroke of the connection lever, the angular stroke thus being defined by a finite angular range;
   first means for generating force feedback on the connection lever about said pivot axis, the first means being connected permanently to the connection lever; and
   second means for generating force feedback on the connection lever, which means are arranged in parallel with the first means; at least one operating element selected from the second means, and the connection lever, comprising mechanical means for connecting them together temporarily, which means are arranged to be active when the connection lever is moved beyond a predetermined angular position in the angular range; the second means including at least one anchoring point that is suitable for defining said predetermined position and being arranged to enable movement of said anchoring point relative to limiter means for limiting angular stroke in order to act while in use to redefine said predetermined positions.

2. The device according to claim 1, wherein the second means comprise:
- a spring including at least one plate secured to one of its ends;
- a drive member that is suitable for moving the spring in order to modify the position of the two ends of the spring relative to the mechanical limitation means of the angular stroke when the spring is unloaded.

3. The device according to claim 1, wherein the operating element includes the anchoring point, the operating element being arranged to be able to be moved by the drive member at the same time as the spring when the spring is unloaded.

4. The device according to claim 3, wherein the operating element comprises a first portion fitted with mechanical means for temporary connection to the connection lever and a second portion that is secured to the first portion and that is secured to one of the ends of the spring in order to connect temporarily the connection lever and the spring during pivoting of the connection lever beyond the predetermined position.

5. The device according to claim 3, wherein the mechanical means for temporary connection comprise a part that is secured to the connection lever and that is shaped to come into abutment against the element.

6. The device according to claim 5, wherein the part is shaped as an angular sector.

7. The device according to claim 5, wherein the first portion comprises two operating fingers as mechanical means for temporary connection, the operating fingers thus together defining a circular arc inside which the part can be moved.

8. The device according to claim 2, wherein the plate directly forms the anchoring point.

9. The device according to claim 1, wherein the second means comprise a first anchoring point and a second anchoring point each defining a predetermined position in the angular range, said second means being arranged to enable only simultaneous movement of said anchoring points relative to the means for limiting angular stroke in order to act while in use to redefine said predetermined positions.

* * * * *